March 1, 1955 D. L. HINGS ET AL 2,703,377

MOLDED WIRING CIRCUIT

Filed June 5, 1951

INVENTORS
Donald L. Hings
BY Stanley A. Hall
Woodling and Krost, Attys.

United States Patent Office 2,703,377

Patented Mar. 1, 1955

2,703,377

MOLDED WIRING CIRCUIT

Donald L. Hings and Stanley A. Hall, Vancouver, British Columbia, Canada

Application June 5, 1951, Serial No. 230,058

8 Claims. (Cl. 317—101)

The invention relates in general to producing an electrical chassis and more particularly to the art of obtaining a compact, easily manufactured radio chassis wherein the electrical connections are made by molding.

An object of the invention is to provide an electrical chassis having molded circuit connections.

Another object of the invention is to provide a nonconducting sheet with molded connections on one or both sides thereof to electrically connect circuit components of a radio chassis.

Another object of the invention is to provide two nonconducting sheets of material spaced a given distance apart in substantially the same plane wherein circuit components bridge the distance between the nonconducting sheets and are molded in place for physical support and electrical interconnection in a radio chassis.

A further object of the invention is to provide two separate nonconducting panels on which are mounted circuit components of a radio with circuit components bridging or connecting these two panels and then bending the leads of these circuit connections adjacent the edge of the panels at substantially a 180° bend to sadwich the circuit components between the two panels.

A further object is to mold the connections of a radio tube socket about the periphery of an aperture in an insulating panel which molded connections serve as the electrical interconnections between the terminals of the tube socket and other circuit components of the radio circuit and also provide physical support to the tube socket.

A still further object is to obtain an electrical chassis on a nonconducting sheet having an aperture therein with a thermionic tube socket placed against one side of the sheet with the terminal lugs thereof extending through the aperture and with individual molded connections to each of the terminal lugs which molded terminal connections have at least a portion in contact with the opposite side of the sheet relative to the tube socket.

Other objects and a fuller understanding may be had by referring to the following description and claims taken in conjunction with the accompanying drawings in which:

Figures 1, 2, 3, 4, 5:
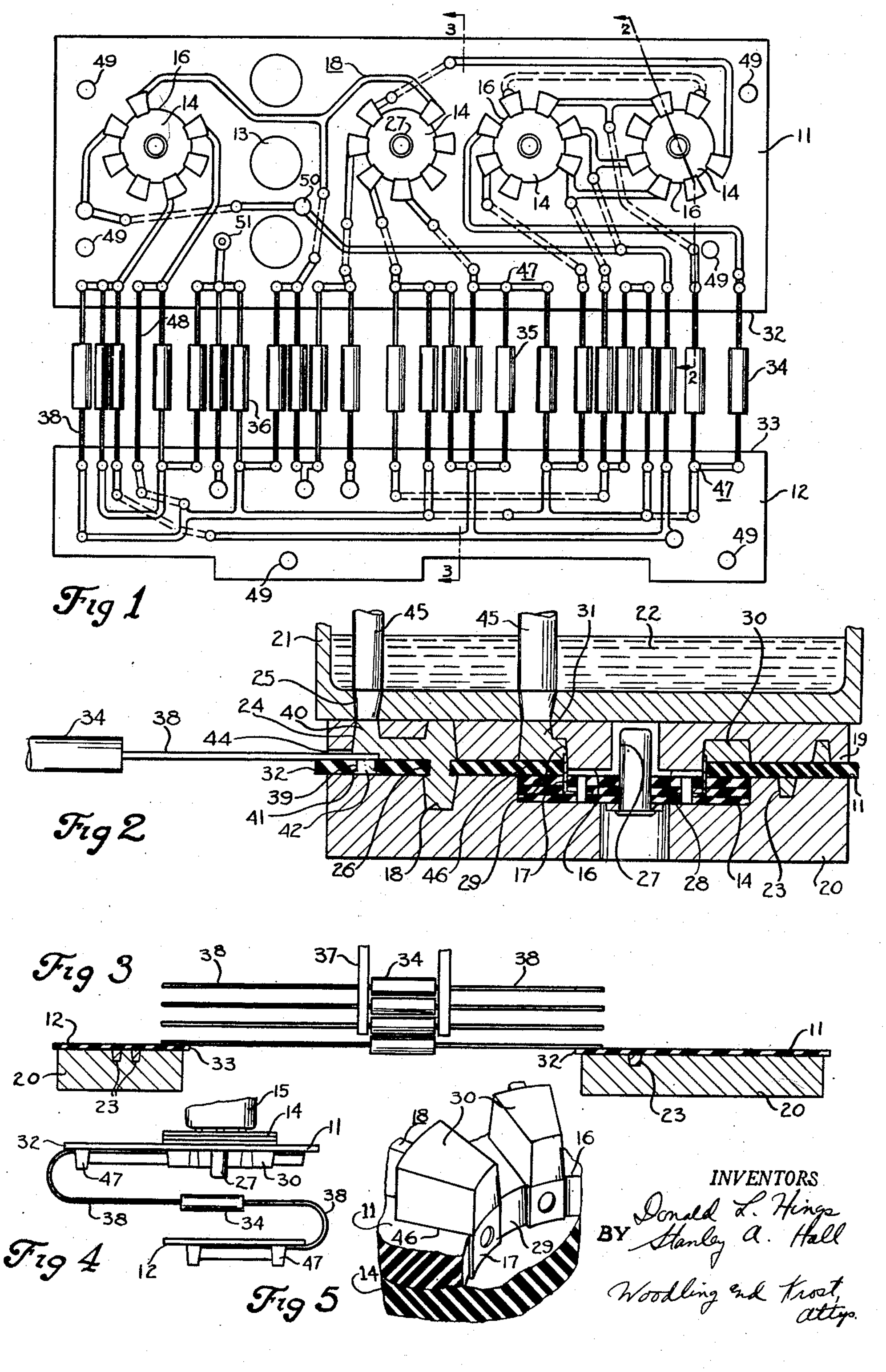
Figure 1 shows a typical layout of a radio chassis produced in accordance with the invention.
Figure 2 is an enlarged cross-sectional view taken along the lines 2—2 of Figure 1 of the radio chassis while in a mold for molding the electrical interconnections.
Figure 3 is a cross-sectional view of the insulating panels, the bottom molds and the bridging circuit means.
Figure 4 is an end view of this radio chassis after being folded into a compact position.
Figure 5 is a perspective view of the completed tube socket connection.

The invention relates generally to methods for producing easily and quickly by standard manufacturing processes the complete wiring system for an electrical chassis and the preferred embodiment is shown as being applied to a radio chassis. The invention contemplates the use of nonconducting sheet means on which are two lines of terminal points separated by a given distance, which lines are in this preferred embodiment, parallel and coextensive. Circuit means of this electrical chassis or radio chassis are then adapted to bridge this given distance between the lines of terminal points. Figure 1 shows a top view of a first nonconducting sheet or insulating panel 11 and a second nonconducting sheet or insulating panel 12. The first insulating panel 11 is adapted preferably to carry the circuit components 13 and other bulky objects such as tube sockets 14 which are adapted to hold thermionic tubes 15. The bulky circuit components 13 may be such items as IF or audio transformers. The tube sockets 14 are adapted to be mounted in a socket hole 16 through which the soldering lugs 17 may be inserted. A superior feature of the invention is the particular manner of mounting the tube socket 14. Only the single aperture or socket hole 16 need be cut in the insulating panel 11 and the tube sockets preferably used are those having terminal lugs or soldering lugs 17 which extend substantially at right angles from the tube socket 14.

The radio chassis is adapted in this preferred embodiment to have all circuit components interconnected by a molded conductor such as that shown by the reference character 18. These molded conductors 18 may be produced in any well known manner of molding, and comprise any electrically conducting flowable medium, such as I have shown in cross section in Figure 2 wherein a top mold 19 and a bottom mold 20 are provided above and below respectively the first insulating panel 11. A suitable receptacle 21 is provided above the top mold 19 for holding the molten metal 22 which receptacle 21 has been shown merely by way of example as a method for introducing the molten metal 22 into the top and bottom molds 19 and 20. The conductors 18 are formed by the flow of the molten metal 22 through grooves 23 or pour point apertures 24 on the top and bottom molds 19 and 20. The pour point apertures 24 correspond to similar apertures 25 in the receptacle 21 for providing a path for the flow of the molten metal 22. The pour point apertures 24 and 25 are preferably tapered to provide a narrow or necked in portion at the juncture of the receptacle 21 and the top mold 19, so that separation of these two members may easily be accomplished. Pins 45 are shown as an example of a manner to control the flow of the molten metal 22. This molten metal 22 by so being introduced into the top and bottom molds 19 and 20 forms the conductors 18 by flowing through the grooves 23. Cross over apertures 26 are provided in the insulating panel 11 so that the conductors 18 may be continuous through the grooves 23 and the lower mold 20 and physically and electrically connect with such conductors 18 formed on the top of the insulating panel 11.

The Figure 2 shows the tube socket 14 as being supported from the under side by the bottom mold 20 so that this tube socket 14 is held flush with the under side of the insulating panel 11. The tube socket 14 as shown has a shield 27 in the center thereof which extends axially between these soldering lugs 17 to act as an electrostatic shield. The top mold 19 has a ring shaped plug 28 with the external periphery 29 thereof pressing firmly against the soldering lugs 17 and thereby pressing them against the edge of the socket hole 16 thus producing a fairly liquid tight joint thereat. The soldering lugs 17, by extending through the socket hole 16 and being pressed firmly against the edge of this socket hole 16, may then be provided with a molded terminal 30 concurrently with the molding process that produces the conductors 18 as shown at the terminal 31. Such a molded terminal connection may be provided by a pour point aperture in the top mold similar to the pour point aperture 24. The socket 14 is thus provided with a good electrical connection with the conductors 18 since it is directly molded thereto and is also provided with a good physical support relative to the insulating panel 11 since the molded terminals 30 are on the opposite side of the insulating panel from the main body of the tube socket 14. In actual practice, these physical connections have proved very durable and capable of resisting great amounts of stress. The Figure 5 is a perspective view of the completed tube socket connection, and the molded terminal 30 is shown as forming a firm bond with the soldering lug 17. The soldering lug 17 may have a hole in the end thereof which is usually used to solder the connection leads of various components such as resistors and condensers thereto. This hole in the end of the soldering lug will be completely filled with the molten metal 22 and a tight bond is thus formed between the soldering lug 17 and the terminal 30. The terminal 30 therefore has an under surface 46 which is in contact with the top surface of the insulating panel 11.

The first insulating panel 11 has a first edge 32 and the second insulating panel 12 has a second edge 33. These first and second edges are, in this preferred embodiment, spaced a given distance apart and aligned substantially parallel and coextensive with each other. Preferably just inside the edges 32 and 33 are lines of terminal points 47. The second insulating panel 12 is preferably just a means for providing electrical interconnection between circuit components of the radio assembly and does not contain such circuit components in this preferred embodiment. The second insulating panel 12 may easily be provided with crossover connections, that is, molded connections on both the top and bottom of this insulating panel 12. Molded conductors 18 may be provided in substantially the same manner as the conductors 18 on the first insulating panel 11 and the crossover connections may be provided through crossover apertures 26. The use of the lines of terminal points 47 provides a novel and distinctive feature of the invention since, in this preferred embodiment, circuit components such as resistors 34, condensers 35 and other circuit means 36 may bridge this given distance between the lines of terminal points 47. A connecting lead 48 may also be used to bridge this given distance, should such connection be desired. This novel arrangement permits rapid and easy assembly and manufacture since all the circuit components 34, 35 and 36 may be easily placed in position to so bridge this given distance. In Figure 1 the bendable connection means 38 are shown as being short, which might be desirable if the circuit means 34, 35 and 36 are small, and if the completed assembly is not to be sandwiched into an S-shape, as shown in Figure 4. To provide such an easy method of placing the circuit components in this bridge position, a series of hoppers or shoots 37 may be utilized as diagrammatically shown in Figure 3. In Figures 3 and 4, the bendable connection means 38 are shown as being fairly long, to accomplish the sandwiching feature shown in Figure 3. These bendable connection means 38 may thus be made any convenient length depending on the final assembly and/or size of components. The radio chassis may be thus easily assembled since such circuit components 34, 35 and 36 may be dropped or fed into place by the hoppers 37 whereinafter these circuit components may be molded into the radio assembly. The circuit components 34, 35 and 36 preferably are provided with bendable leads or connection means 38 extending from each end thereof and it is these connecting means that touch or rest upon the edges 32 and 33, and extend to the terminal points 47. Preferably these connection means 38 are made to extend inwardly from the edges 32 and 33 and lie on top of the insulating panels 11 and 12. The pour point apertures 24, which preferably are the terminal points 47, are arranged to correspond with each of the connection means 38 so that each of the circuit components may be molded into the entire radio assembly. This molding, besides providing an electrical interconnection of all circuit components, also provides for a physical support thereof. These pour point apertures 24 preferably have a hold down aperture 39 in the insulating panels 11 and 12 to thus securely physically fasten the conductors 18 at the pour point terminal 40. This hold down aperture 39 may be provided with a counter bore 41 on the under side thereof to provide an enlarged head 42 to prevent the pour point terminal 40 from working loose.

The top mold 19 may be provided with very small grooves to provide a recess for the connection means 38. These grooves permit a tight or flush contact between the top mold 19 and the resulting panel 11 or 12 so that flash over between adjacent pour point terminals will not occur. In the preferred embodiment of the invention, such grooves are not provided and the possibility of flash over between adjacent pour point terminals 40 is prevented by the use of one or more asbestos strips 44. Such asbestos strips may be placed on the top mold 19 along the edge thereof and/or may also be placed on top of the insulating panels 11 and 12 adjacent the edges 32 or 33. The connection means 38 therefore is squeezed between the asbestos strips 44 to provide a fairly tight contact to thus prevent such flash over.

The bendable connection means 38 provides an additional feature of the invention wherein the radio assembly may be made more compact for placing within a confining space such as a radio cabinet. Such a compact arrangement may be as shown in Figure 4 wherein the connection means 38 are bent substantially adjacent each of the edges 32 and 33 at substantially a 180° angle, to thus sandwich the components 34, 35 and 36 between the insulating panels 11 and 12.

The entire invention therefore is directed to the method and the article produced by molding the connections to an electrical chassis. Where this invention is directed to the production of a radio chassis the assembly may be easily and quickly accomplished by punching the suitable apertures in the insulating panels 11 and 12, placing them on the bottom mold 20 dropping the circuit component 34, 35 and 36 into place, placing the top mold 19 in place and then introducing the molten metal 22 into the grooves 23 to thus form the entire molded conductor system.

In the Figure 1, alignment holes 49 are shown which are used to align the insulating panels 11 and 12 relative to the top and bottom molds 19 and 20. The bulky items such as IF transformers or audio transformers denoted generally by the reference character 13, may be mounted on the insulating panel 11 in any suitable fashion. Should the electrical connections to such components 13 be by flexible leads rather than by the mounting lugs themselves, such leads may go to connecting terminals 50, and be soldered thereto after the complete molded conductor system has been molded and the molds 19 and 20 removed. An eyelet 51 has been shown should it be desired that the component be removable. The electrical connection to this eyelet would then be similar to a pin and jack.

Although the invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical chassis comprising first and second nonconducting sheets each having a first side, a line of a given number of terminal points on said first side of each sheet with said lines being separated by a given distance, circuit means equal in number to said given number with each having a bendable connecting lead extending from each of two ends thereof, said circuit means and said connecting leads bridging said given distance at each of said terminal points, hold down apertures extending through said sheets at each of said terimnal points, and molded means electrically interconnecting said terminal points and filling said hold down apertures for providing physical support of said terminal points and said circuit means relative to said sheets, said bendable connecting leads being bent substantially 180 degrees to thereby sandwich said circuit means between said first and second sheets.

2. An electrical chassis comprising first and second nonconducting sheets each having first and second sides, a line of a given number of terminal points on said first side of each sheet adjacent one edge thereof with said lines being substantially paralel and coextensive and being separated by a given distance, circuit means equal in number to said given number with each having a bendable connecting lead extending from each of two ends thereof, said circuit means and said connecting leads bridging said given distance at each of said terminal points, hold down apertures extending through said sheets at each of said terminal points, molded means electrically interconnecting said terminal points and filling said hold down apertures for providing physical support of said terminal points and said circuit means relative to said sheets, said bendable connecting leads being bent substantially 180° substantially adjacent said edges to thereby sandwich said circuit means between said first and second sheets.

3. An electrical chassis including nonconducting sheet means having first and second flat sides, a first surface defining an aperture in said sheet means extending from said first to said second side, a thermionic tube socket covering said aperture on said first side and having a plurality of terminal lugs extending into said aperture and generally perpendicular to said sheet means and substantially in contact with said first surface, a plurality of first and second terminal points defining first and second lines respectively on said second side, circuit means having bendable connection means extending from each of two ends thereof for bridging across in a straight condition from said first line to said second line and contacting only said sheet means second side, and molded metallic connections interconnecting said bendable connection means and said terminal lugs for providing electrical connection thereto and physical support thereof.

4. An electrical chassis including nonconducting sheet means having first and second flat sides, a first surface defining an aperture in said sheet means extending from said first to said second side, a thermionic tube socket covering said apertures on said first side and having a plurality of terminal lugs extending into said aperture and generally perpendicular to said sheet means and substantially in contact with said first surface, a plurality of first and second terminal points defining first and second lines respectively on said second side, circuit means having bendable connection means extending from each of two ends thereof for bridging across in a straight condition from said first line to said second line and contacting only said sheet means second side, hold down apertures at said terminal points, and means for holding said tube socket and terminal points firmly in place from said second side and providing electrical connection to said terminal lugs and said bendable connection means comprising molded metallic connections to each of said terminal lugs and said terminal points extending onto at least a portion of said second side.

5. The method of producing an electrical chassis from two nonconducting sheets, suitable components and circuit means having bendable connecting leads, comprising the steps of forming suitable apertures in said sheets, mounting said components on said sheets with the connection means thereof extending at least partially into said apertures, separating said sheets a given distance apart with adjacent edges thereof substantially coextensive and with the said sheets in substantially the same plane, bridging said given distance with the circuit means having the bendable connecting leads in a straight line condition and contacting only one flat side of each of said sheets, molding connection means for interlinking said components and said circuit means thereby effecting electrical connection and physical support of said components and circuit means, and bending said bendable connecting leads substantially adjacent each of said edges in approximately a 180 degree bend to thereby sandwich said circuit means between said sheets.

6. The method of producing an electrical chassis from first and second molds having indentations, circuit means having a connecting lead extending from each of two ends thereof, and first and second nonconducting sheets each having first and second sides comprising the steps of establishing a line of a given number of terminal points on each sheet, making hold-down apertures extending through said sheets at each of said terminal points with the apertures being enlarged on the sheet first sides, separating said lines of terminal points a given distance, bridging said given distance with said circuit means and connecting leads in a straight line condition at a majority of said terminal points with said connecting leads contacting said sheet second sides only, contacting said first and second molds on said first and second sides respectively of said sheets, and introducing an electrically conducting flowable medium into said indentations for electrically interconnecting said terminal points and for filling said hold-down apertures for providing physical support of said terminal points and said circuit means relative to said sheets.

7. The method of producing an electrical chassis from first and second molds each having indentations, circuit means having a bendable connecting lead extending from each of two ends thereof, and first and second nonconducting sheets each having first and second flat sides, comprising the steps of establishing a line of a given number of terminal points on said first side of each sheet adjacent one edge thereof with said lines being substantially parallel and coextensive, making hold-down apertures extending through said sheets at each of said terminal points with the apertures being enlarged at the sheet first sides, separating said lines of terminal points a given distance, bridging said given distance with said circuit means and said connecting leads in a straight line condition at a majority of said terminal points with said connecting leads contacting said sheet second sides only, contacting said first and second molds with said first and second sides respectively of said sheets, introducing an electrically conducting flowable medium into said indentations for electrically interconnecting said terminal points and for filling said hold-down apertures for providing physical support of said terminal points and said circuit means relative to said sheets, removing said molds from said sheets, and bending said bendable connecting leads substantially 180 degrees substantially adjacent said edges to thereby sandwich said circuit means between said first and second sheets.

8. The method of producing connections to a thermionic tube socket having terminal lugs extending therefrom and supporting said socket on nonconducting sheet means having first and second sides, including the use of a first mold having separate depressions therein to encompass part of the exposed portion of each of said terminal lugs, said method comprising the steps of making a circular aperture in said sheet means, inserting the terminal lugs of said tube socket from said first side of said sheet means into said aperture substantially in contact with the periphery thereof, forcing said tube socket against said first side of said sheet means, contacting said second side of said sheet means with said first mold in a position such that said separate depressions encompass part of the exposed portion of each of said terminal lugs and holding said terminal lugs firmly in place against the periphery of said aperture, and generally perpendicular to the plane of said sheet means, and injecting molten metal into said mold depressions to provide electrical connection to and physical support of said terminal lugs, said molded terminal lug connection having a surface in contact with said second side of said sheet means.

References Cited in the file of this patent

UNITED STATES PATENTS

| | | |
|---|---|---|
| 1,999,137 | Flewelling | Apr. 23, 1935 |
| 2,019,625 | O'Brien | Nov. 5, 1935 |
| 2,244,009 | Hiensch et al. | June 3, 1941 |
| 2,270,166 | Hiensch | Jan. 13, 1942 |
| 2,431,198 | Posen | Nov. 18, 1947 |
| 2,444,037 | Fritschi | June 29, 1948 |
| 2,502,291 | Taylor | Mar. 28, 1950 |

FOREIGN PATENTS

| | | |
|---|---|---|
| 515,354 | Great Britain | Dec. 4, 1939 |